United States Patent [19]

Shortt

[11] 3,908,792

[45] Sept. 30, 1975

[54] PASSENGER CARRYING ASSEMBLY

[75] Inventor: Ronald F. Shortt, Whitehorse, Canada

[73] Assignee: Jimmy Rails (U.S.A.) Inc., Rexdale, Canada

[22] Filed: Mar. 29, 1974

[21] Appl. No.: 456,386

[52] U.S. Cl. ............... 182/37; 182/117; 182/142; 403/316; 403/356
[51] Int. Cl.² ......................................... E04G 3/10
[58] Field of Search ....... 182/36, 37, 142, 143, 144, 182/117; 403/356, 317, 316

[56] References Cited
UNITED STATES PATENTS

| | | | |
|---|---|---|---|
| 2,178,956 | 11/1939 | Dyer | 182/37 |
| 2,589,803 | 3/1952 | Haley | 182/36 |
| 2,645,531 | 7/1953 | Rector | 182/37 |
| 2,692,168 | 10/1954 | Gregory | 182/37 |
| 3,782,055 | 1/1974 | Spencer | 52/758 D |

FOREIGN PATENTS OR APPLICATIONS 862,165  1/1953  Germany ............... 182/37

*Primary Examiner*—Reinaldo P. Machado
*Attorney, Agent, or Firm*—Fetherstonhaugh & Co.

[57] ABSTRACT

A passenger carrying assembly for supporting passengers in close proximity to a tall structure including a passenger carrying member, at least one support rail having a length which is greater than the length of the passenger carrying member and adjustable support means for supporting the support rail in an elevated horizontally extending position, the adjustable support means being adjustable to vary the height of the horizontal plane in which the support rail is located with respect to the tall structure. Mounting means is also provided for mounting the passenger carrying member on the guide rail for longitudinal movement with respect to the guide rail thereby providing both vertical and longitudinal movement of the passenger carrying member.

1 Claim, 10 Drawing Figures

PASSENGER CARRYING ASSEMBLY

FIELD OF INVENTION

This invention relates to passenger carrying assemblies for supporting passengers in close proximity to tall structures. In particular, this invention relates to a passenger carrying system which incorporates a passenger carrying component such as a support stage, bosun's chair or the like which permits vertical and longitudinal movement of the passenger carrying component with respect to the supporting structure.

PRIOR ART

Movable passenger carrying stages are widely used by maintenance crews servicing the exterior of high-rise buildings and elevated structures. Examples of the services performed on adjustable stages include window washing, painting, sand-blasting and the like. Similar systems are also used in the interior of buildings by interior decorators and the like. The conventional stage includes means for mounting cables at the upper end of the structure and means for lowering the stage directly from the upper connection so that the stage is lowered in a series of vertical steps. There is no substantial horizontal adjustment of the position of the stage available in the conventional structures. In order to obtain access to an area of the building which is laterally displaced from the stage in its first position, it is necessary to relocate the mountings from which the stage is suspended to a position directly above the point to which the operator wishes to obtain access.

In a further application in which similar difficulties are encountered a riveter employs a passenger carrying device in the form of a bosun's chair to gain access to the work zone. Again limited lateral movement is available when a conventional bosun's chair system is employed.

SUMMARY OF INVENTION

The present invention overcomes the difficulties of the prior art described above and provides a passenger carrying assembly wherein the passenger carrying member is mounted for vertical and horizontal movement with respect to the structure to which it provides access.

According to an embodiment of the present invention, the passenger carrying assembly for supporting a passenger in close proximity to a tall structure comprises a passenger carrying member, at least one support rail having a length which is greater than the length of the passenger carrying member, adjustable support means for supporting said support rail in an elevated horizontally extending plane, said adjustable support means being adjustable to vary the height of said horizontal plane with respect to said tall structure and mounting means for mounting the passenger carrying member on the guide rail means for longitudinal movement with respect to the guide rail means.

The present invention also provides a support rail which has a wheeled dolly member mounted for rotation inwardly thereof such that the wheels of the dolly member are locked within a track formed internally of the support rail such that the dolly can only be removed from the rail by way of an open end thereof. This structure encloses a support surface on which the dolly runs so that it is protected against damage resulting from impact with the structure from which the rail is supported.

According to a further embodiment of the present invention, the support rail has a length which is at least twice the length of the passenger carrying member so that the passenger carrying member may be moved longitudinally of the support rail a distance at least equal to twice the length of the passenger carrying member.

The invention will be more clearly understood after reference to the following detailed specification read in conjunction with the drawings wherein FIG. 1 is a side view illustrating a stage mounted for longitudinal movement with respect to a bridge;

Figure 1:
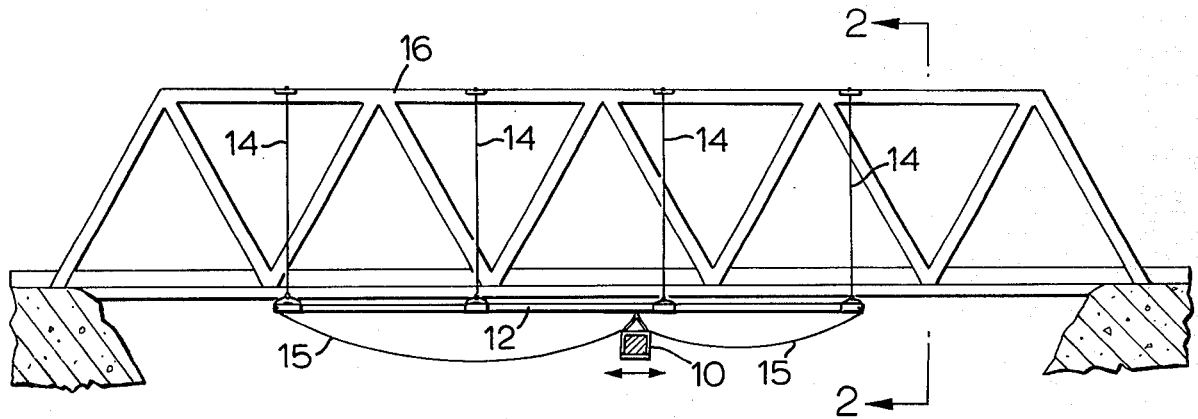
Figure 2:
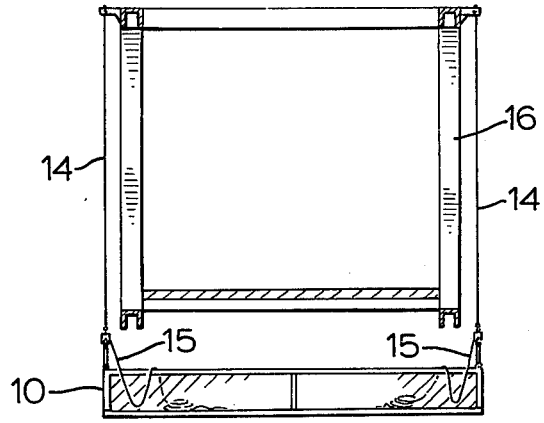
FIG. 2 is a sectional view in the direction of the arrows 2—2 of FIG. 1.

With reference to FIGS. 1 and 2 of the drawings, it will be seen that a passenger carrying stage member 10 is supported from a pair of spaced parallel support rails 12 which are in turn supported by a plurality of cables 14 which are secured at their upper ends with respect to the bridge structure 16. This arrangement permits the stage 10 to move longitudinally with respect to the bridge member over substantially the full length of the support rails 12. To achieve longitudinal movement of the stage the passenger manually engages the light line 15 which is connected to the opposite ends of at least one rail 12. The line 15 has a sufficient length to permit a substantial length to be stored within the stage so as to be unwound during lowering of the stage with respect to the rail 12.

Figure 3:
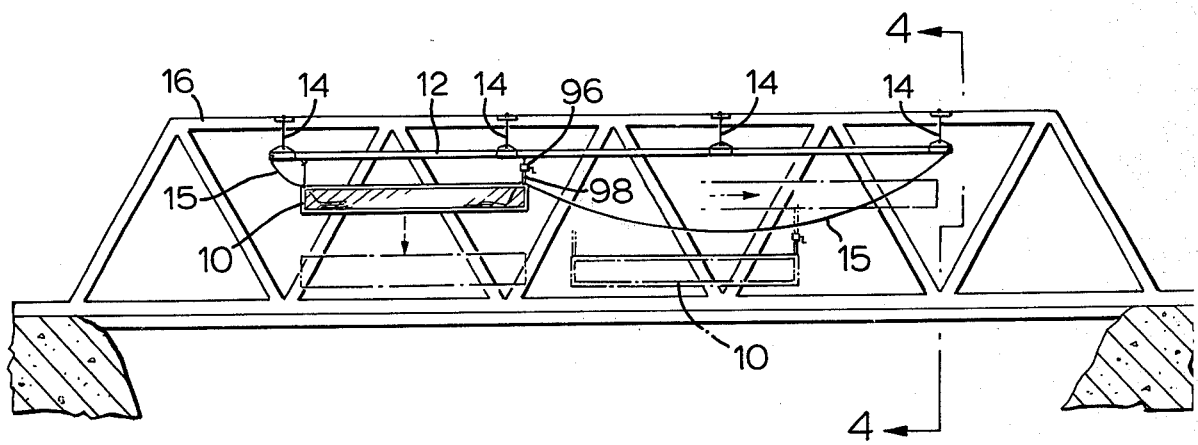
FIG. 3 is a side view of a stage mounted for longitudinal movement with respect to a bridge according to a further embodiment of this invention.
Figure 4:
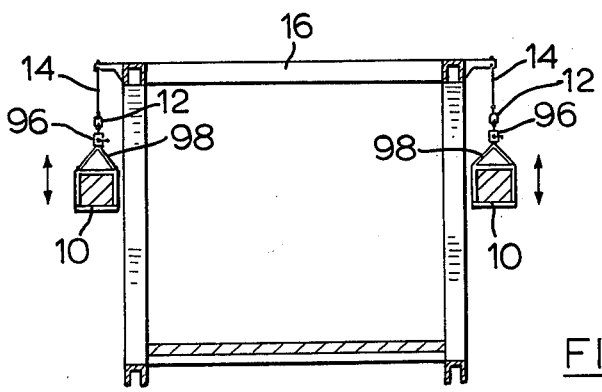
FIG. 4 is a sectional end view in the direction of the arrows 4—4 of FIG. 3.

In the embodiment illustrated in FIGS. 3 and 4 of the drawings, the stages 10 are again mounted on longitudinally extending support rails 12. In this instance, however, the stage 10 is longitudinally oriented and connected at either end to the rail 12 on one side of the bridge for longitudinal movement thereon. Again longitudinal movement is achieved by pulling on the light line 15 which is connected to opposite ends of rail 12 and is accessible to a passenger carried by the stage 10.

Figure 5:
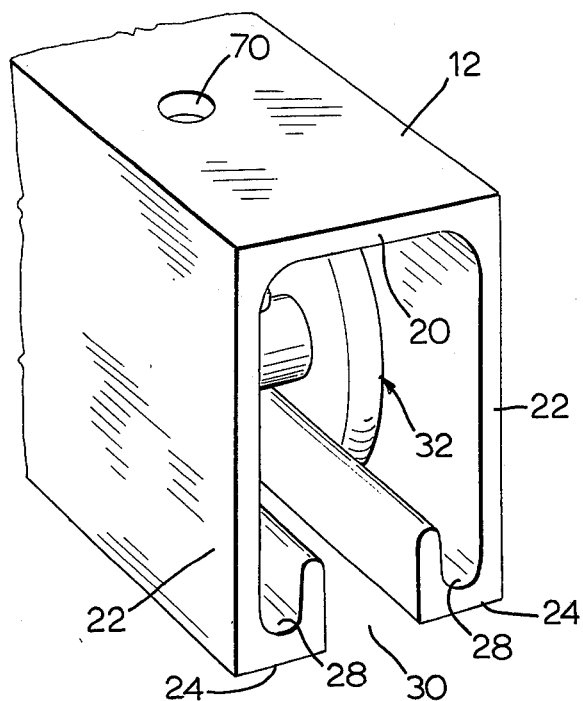
FIG. 5 is an enlarged cross-sectional view of a support rail according to an embodiment of the present invention.

The structure of the support rail 12, according to an embodiment of the present invention, is illustrated in FIG. 5 of the drawings. The support rail is preferably made from an extruded aluminum alloy and has a section including a base wall 20, a pair of oppositely disposed side walls 22 and a pair of flange members 24. The flange members 24 each have an inwardly directed portion 26. Recessed bearing surfaces 28 are formed on the flanges 24 and the upwardly projecting portions 26 serve to lock the dolly wheels which will be described hereinafter in an operative position within said rail. In the embodiments of the invention illustrated in FIGS. 1 to 4, the support rail 12 is mounted in the position shown in FIG. 5 with the passageway 30 which is formed between the flanges 22 and 24 opening downwardly therefrom.

Figure 6:
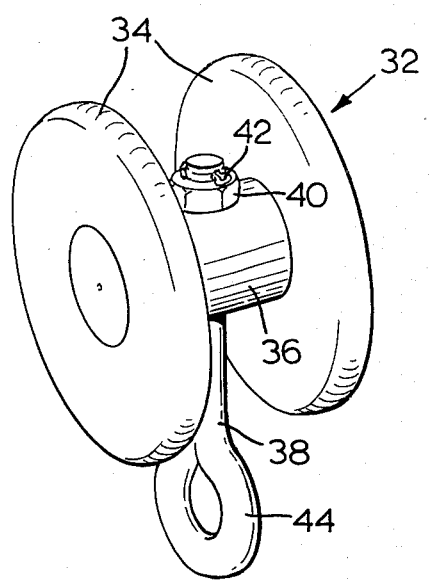
FIG. 6 is an enlarged pictorial view of a support dolly for use with the support rail of FIG. 5.

FIG. 6 of the drawings illustrates a support dolly which is generally identified by the reference numeral 32. The dolly consists of a pair of circular wheel members 34 which are mounted on a body 36 which extends between the wheel members 34. A hanger bolt 38 is mounted on the body 36 and secured with respect to the body 36 by means of a lock nut 40 and a cotter pin 42. The hanger bolt 38 has an eye portion 44 for supporting a winch or the like from which the stage supporting cable depends. The dolly wheels 34 are adapted to fit within the recessed bearing surfaces of the support rail to be movable longitudinally thereof by rotation of the dolly wheels 34 along the bearing surfaces 28.

Figure 7:
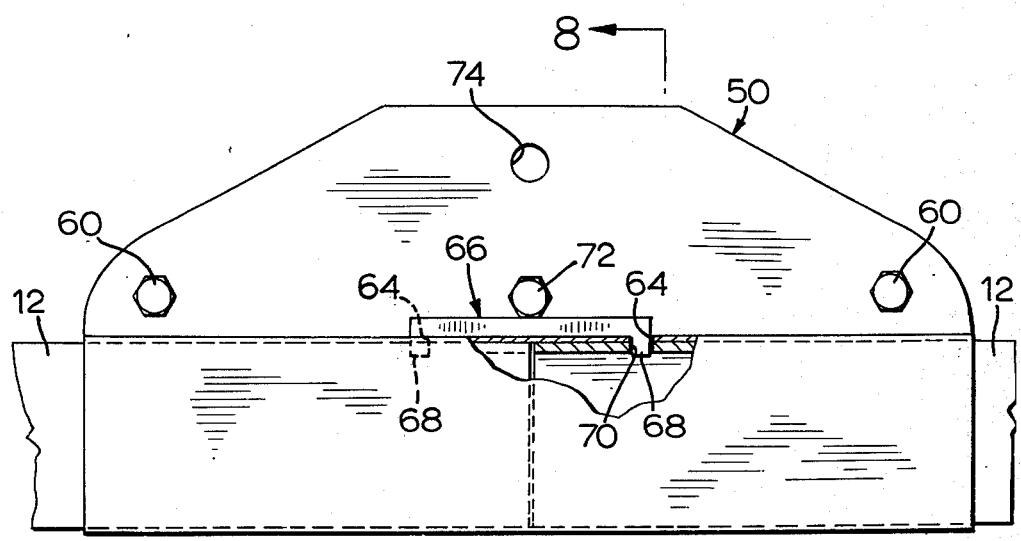
FIG. 7 is a front view of a rail coupler member according to an embodiment of the present invention.
Figure 8:
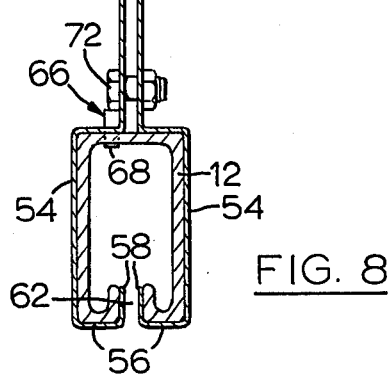
FIG. 8 is an end view of the coupler member of FIG. 7.

In order to connect a number of lengths of rail in end to end relationship to form the support rail of the present invention, coupler member 50 is provided. The coupler member 50 consists of two plates 52 which are bent upon themselves at the lower end thereof to provide a pair of spaced parallel side walls 54, bottom walls 56 and flanges 58 which cooperate with one another to form an enclosure adapted to receive the ends of a pair of rail sections 12 in an end to end abutting relationship as illustrated in FIG. 7 of the drawings. The two plates 52 are secured to one another by means of locking bolts 60. A longitudinal passageway 62 is formed between the flanges 58 in alignment with the longitudinal passage 30 of the rails 12. Passages 64 are formed in one of the top walls of the coupler member 50, one on either side of the centre of the length of the coupler member 50, and a U-shaped locking pin 66 has opposite end portions 68 thereof adapted to project through the passages 64 to engage passages 70 formed adjacent each end of the rails 12 to secure the rails 12 against longitudinal movement with respect to the coupler member 50. It will be noted that the locking pin 64 is disposed directly below the head of the locking bolt 72 which serves to secure the two portions of the coupler member 50 together. This prevents removal of the locking pin upon assembly of the coupler mechanism. Passages 74 are formed towards the upper end of the coupler member 50 and are used to secure the coupler member 50 with respect to cables 14.

Figure 9:
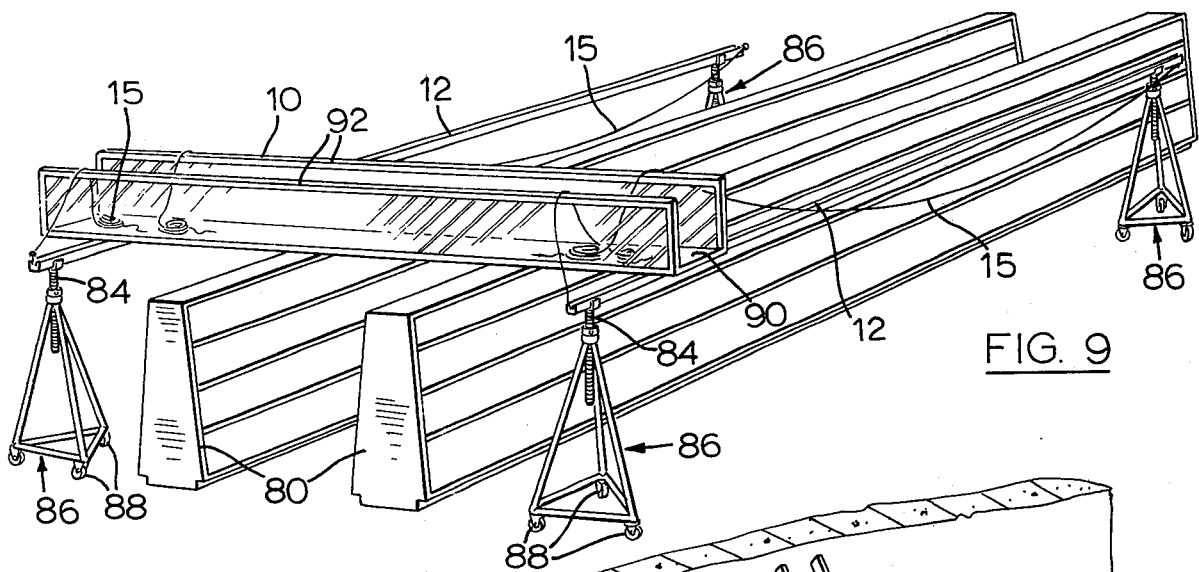
FIG. 9 is a pictorial view illustrating a stage mounted for longitudinal movement with respect to a different form of elevated structure.

FIG. 9 of the drawings illustrates a further embodiment of the invention wherein the passenger carrying stage member 10 is mounted above a pair of spaced support rails 12. This structure permits the passenger support stage to be moved longitudinally over an elevated structure such as a storage shelving or the like 80 to provide access to the ceiling of a room for painting and the like. The support rails 12 in this embodiment are located in an inverted positon with respect to that illustrated in FIG. 5 of the drawings so that the longitudinal passageway 30 opens upwardly therefrom. In this embodiment, a dolly similar to the dolly illustrated in FIG. 6 of the drawings will run on bearing surfaces formed on the transverse wall 20 of the rail member 12. The rail members 12 are supported by posts 84 which project downwardly from the support rail at spaced intervals along the length thereof. The support posts 84 are mounted on tripod supports 86. The support posts 84 may be threadably mounted in the upper ends of the tripods 68 so that the height of the guide rails 12 may be adjusted by a jacking nut mounted at the upper end of the tripod stands 86. In the embodiment illustrated in FIG. 9, the support stage 10 is mounted for movement longitudinally of the rails 12 over the full length of the rails. Additionally, the tripod support stands 86 are mounted on castor wheel 88 so that the position of the tripod stands 86 may be adjusted as required in use.

The structure of the passenger support stage is shown in detail in FIG. 9 of the drawings as including a bottom wall 90 and a pair of oppositely disposed side walls 92. End walls (not shown) may also be located at each end of the stage to close the ends of the stage.

In order to permit the stage 10 to be raised or lowered with respect to the guide rail 12 in the embodiments in which it is suspended from the guide rails 12, an unwinding mechanism such as a winch 96 of the type commonly used to effect lowering of a conventional swing stage may be mounted between the support dolly and the upwardly extending frame members 98 at either end of the stage. The winch permits controlled lowering of the stage by the passenger or passengers. An additional winch mechanism may be provided between the stage frame and the support rail for raising and lowering the stage as required.

Figure 10:
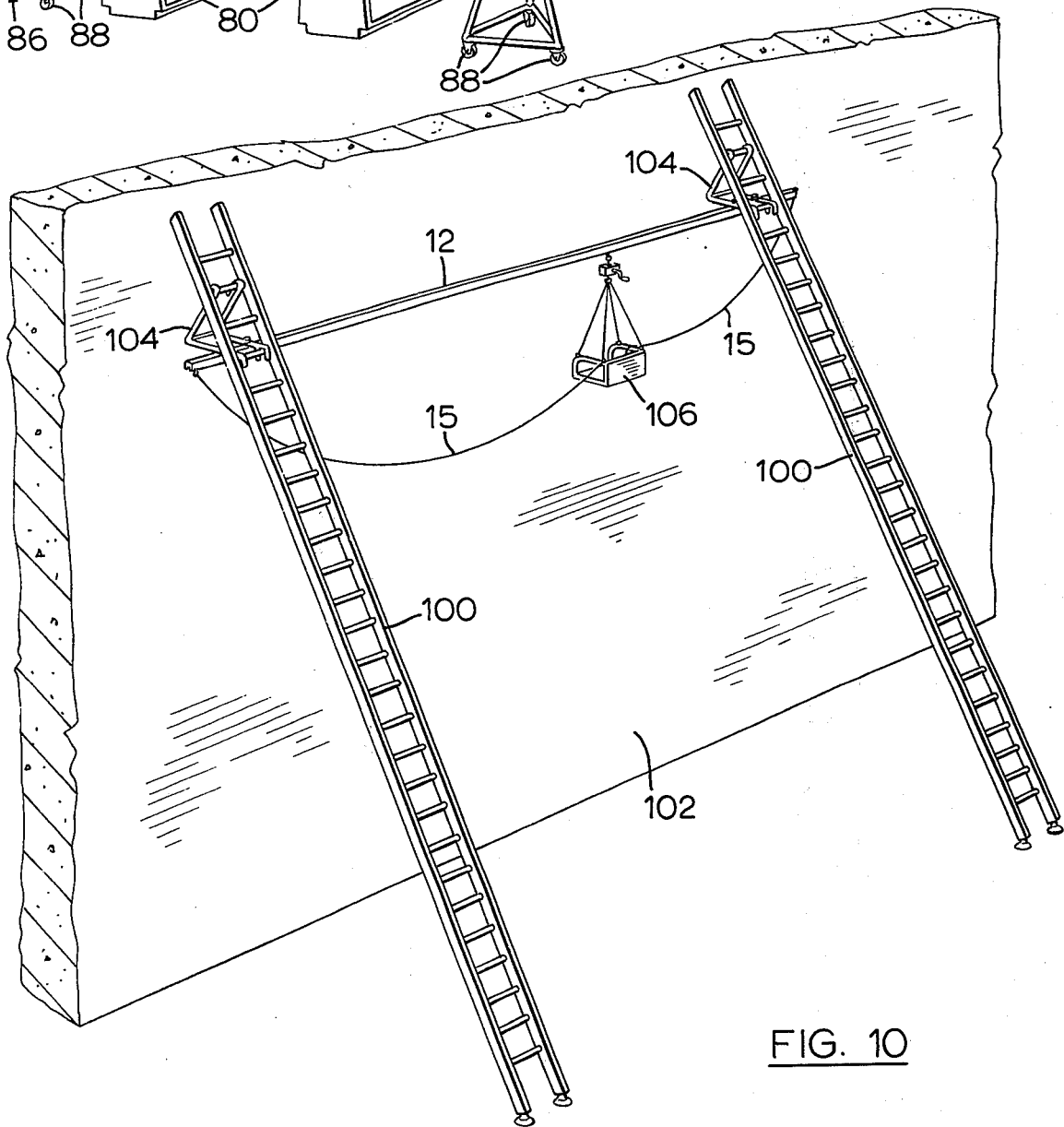
FIG. 10 is a pictorial view illustrating a further embodiment of the present invention.

FIG. 10 of the drawings illustrates a further embodiment of the invention in which a pair of ladders 100 are erected and lean against a wall 102. A guide rail 12 is mounted at the upper ends of the ladders 100 and extends transversely therebetween. The rail 12 is suspended from the ladders 100 by means of conventional ladder jacks 104. A bosun's chair 106 is then suspended from the rail 12 in the manner previously described with respect to the embodiments illustrated in FIGS. 1 to 4. Again the rail 12 provides lateral mobility which winches 96 provide vertical mobility. This assembly provides access to all of the area of the adjacent wall which underlies the rail 12.

From the foregoing it will be apparent that the present invention provides a simple and efficient stage assembly for supporting a passenger in close proximity to a tall structure. One of the principle advantages of the stage assembly of the present invention over conventional scaffolding and conventionally rigged swing stages is the fact that the stage structure of the present invention permits horizontal movement of the stage with respect to the structure in asssociation with which it is used. The stage assembly of the present invention is readily portable and may be assembled and disassembled with respect to the structure in association with which it is to be used without difficulty.

With the conventional structures which are at present in use, a considerable amount of time is spent in relocating the position of the stage with respect of the structure from which it is supported in order that workmen on the stage may be in a position to perform their work. The significance of the time lost in re-rigging conventional scaffolding or conventional swing stages will be apparent when it is realized that in many instances the estimates given for the cost of painting a building which is one story high are established by estimating the cost of painting the ground floor and multiplying the cost by a factor of ten for each floor above the ground floor.

A further advantage of the stage assembly of the present invention is that it provides a structure which is safer than the swing stages presently in use. When conventional swing stages are used, it is necessary to re-rig the stage from time to time in order to move the structure laterally across a building or the like. Many of the failures which have occurred in swing stages have resulted from improper rigging of the stage and obviously the more often it is necessary to rig the stage, the greater the chance of an accident resulting from improper rigging. In constrast, the stage assembly of the present invention may be extended over substantially the full length of the structure from which it is supported by adding additional lengths to the guide rail.

It has been found that a support rail suitable for the present invention may be made from extruded aluminum alloy such as Alcan Alloy 6351 which is available from Alcan Canada Products Limited.

It has been found that a beam having the cross-section illustrated in FIG. 5 of the drawings measuring 3 inches in width, 4.5 inches in height, 0.25 inch wall thickness, 1 inch flange width, 1 inch lip height provides a light-weight support rail which may be supported at 20 foot intervals along its length and which is in turn capable of supporting a conventional passenger carrying stage measuring about 35 feet in length and weighing about 4½ lbs. per foot length. It has been found that a support rail having the above dimensions and made from an aluminum alloy such as Alcan Alloy 6351 available from Alcan Canada Products Limited is capable of supporting a stage of the type described above will have a maximum deflection over a 20 foot length of about 4.345 inches.

In use, the support rail 12 is suspended from the structure in a horizontal plane by means of cables 14. The stage 10 is then suspended from the support rail 12 by cables 98. As shown in the embodiment illustrated in FIG. 3 of the drawings, the stage may be initially located towards one end of the support rail. In order to work on the supporting structure, the stage 10 may be progressively moved longitudinally of the support rail 12 along the horizontal path shown in broken lines. Alternatively the stage 10 may be lowered vertically from its position shown in FIG. 3 so as to provide access to the complete height of the work structure and thereafter the stage may be raised to the position shown in FIG. 3, advanced one full stage length, and again lowered over the full height of the work structure. This process may be repeated several times in order to provide access to the work structure over its full height over the full length of the support rail.

In applications such as plastering or stuccoing the lateral mobility of the stage of the present invention is of particular advantage because in order to prevent unsightly seams plasterers must work the entire horizontal width at one time, therefore, they do not use conventional swing stages. They now must use pipe scaffolding. The passenger support system of the present invention permits plasterers to work off a swing stage. They can work over the entire horizontal width of a building, raise the stage by one level and repeat the plastering process.

The system of the present invention permits workers to start working at the top or at the bottom of any structure. This is extremely important for certain jobs like window washing or for rivetting or applying panel sidings.

It will be understood that while in the specific embodiments illustrated and described above reference has been made to a stage member, the passenger carrying device may be in the form of a bosun's chair, a sling or any other suitable passenger carrying device.

From the foregoing it will be apparent that the stage assembly of the present invention provides a structure which permits the servicing of a tall structure without requiring repeated re-rigging of the stage supporting mechanism.

These and other advantages of the present invention will be apparent to those skilled in the art without departing from the scope of the invention.

What I claim as my invention is:

1. A passenger carrying assembly for supporting a passenger in close proximity to a tall structure, comprising:
   a. a passenger carrying member;
   b. horizontal rail means located above the passenger carrying member and of length greater than the horizontal length of the passenger carrying member;
   c. first adjustable support cable means fixed above the rail means to said tall structure and depending therefrom to the rail means for adjusting its height with respect to said tall structure;
   d. said rail means comprising plural lengths of rail disposed end-to-end and each rail having a top wall, spaced side walls, and bottom inwardly-facing flanges extending toward each other from said side walls;
   e. dolly means in the rail means and running on said flanges;
   f. second adjustable support means coupling said dolly means with said passenger carrying member and supporting the latter below the rail means;
   g. pulling line means extending between the passenger carrying members and the ends of the rail means;
   h. coupler means spaced along said rail means and located at each end-to-end junction of adjacent lengths thereof, each coupler means comprising opposed coupler plates having lower portions shaped to overlie the walls and flanges of the rail means and the coupler plates having upper portions approaching each other and extending upwardly from the rail means and transfixed by bolt means, each coupler means being connected with a first support cable means; and
   i. at each end-to-end junction, locking means comprising two vertical pins joined by a horizontal bar, the pins passing through lower portions of the coupler and respectively through walls of the adjacent rails, and the bar of the locking means being confined against the coupler means by one of said bolt means to prevent removal of the pins.

* * * * *